US012055092B1

(12) United States Patent
Yamamoto et al.

(10) Patent No.: US 12,055,092 B1
(45) Date of Patent: Aug. 6, 2024

(54) HYDROGEN SUPPLY DEVICE AND HYDROGEN ENGINE VEHICLE

(71) Applicant: TOYOTA JIDOSHA KABUSHIKI KAISHA, Toyota (JP)

(72) Inventors: Ryosuke Yamamoto, Aichi-ken (JP); Tomohiro Nakano, Nagoya (JP); Hiroya Nagata, Toyota (JP); Yoshifumi Kawakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/395,857

(22) Filed: Dec. 26, 2023

(30) Foreign Application Priority Data

Mar. 6, 2023 (JP) ................................ 2023-033482

(51) Int. Cl.
*F02B 43/12* (2006.01)
*F02D 41/00* (2006.01)

(52) U.S. Cl.
CPC .......... *F02B 43/12* (2013.01); *F02D 41/0027* (2013.01); *F02B 2201/04* (2013.01); *F02D 2200/0602* (2013.01)

(58) Field of Classification Search
CPC .. F02B 43/12; F02B 41/0027; F02B 2201/04; F02D 2201/0602
USPC .......................................................... 123/1 A
See application file for complete search history.

(56) References Cited

U.S. PATENT DOCUMENTS

2024/0003494 A1 * 1/2024 Ito .......................... F02M 21/06

FOREIGN PATENT DOCUMENTS

| | | | | |
|---|---|---|---|---|
| JP | 2004-316779 | A | | 11/2004 |
| JP | 2004316779 | A | * | 11/2004 |
| JP | 2006-527808 | A | | 12/2006 |
| JP | 2008-309075 | A | | 12/2008 |
| JP | 2021-021433 | A | | 2/2021 |
| WO | 2004/111527 | A1 | | 12/2004 |

* cited by examiner

*Primary Examiner* — Mahmoud Gimie
(74) *Attorney, Agent, or Firm* — SoraIP, Inc.

(57) ABSTRACT

The hydrogen supply device includes a liquid hydrogen pump that boosts the pressure of liquid hydrogen stored in a liquid hydrogen tank, a vaporizer that converts the liquid hydrogen discharged from the liquid hydrogen pump into hydrogen gas, a pressure chamber that a hydrogen gas that flows out from the vaporizer is filled with and that supplies the filled hydrogen gas to a hydrogen engine, and a pump control unit. The pump control unit controls the discharge flow rate of the liquid hydrogen pump so that the actual pressure in the pressure chamber becomes a target pressure based on the hydrogen flow rate supplied to the hydrogen engine, the actual pressure in the pressure chamber, and the rotation speed of the hydrogen engine. At the same time, the target pressure of the pressure chamber is changed according to the rotation speed of the hydrogen engine.

5 Claims, 6 Drawing Sheets

HYDROGEN SUPPLY DEVICE AND HYDROGEN ENGINE VEHICLE

CROSS-REFERENCE TO RELATED APPLICATION

This application claims priority to Japanese Patent Application No. 2023-033482 filed on Mar. 6, 2023 incorporated herein by reference in its entirety.

BACKGROUND

1. Technical Field

The present disclosure relates to a structure of a hydrogen supply device that supplies hydrogen gas to a hydrogen engine, and a structure of a hydrogen engine vehicle equipped with the hydrogen supply device.

2. Description of Related Art

Japanese Unexamined Patent Application Publication No. 2004-316779 (JP 2004-316779 A) discloses a hydrogen supply device including a liquid hydrogen tank, a hydrogen pump, an evaporator, and a pressure hydrogen tank. This hydrogen supply device pressurizes liquid hydrogen stored in a liquid hydrogen tank with a hydrogen pump, then vaporizes the liquid hydrogen with an evaporator, and stores hydrogen gas in the pressure hydrogen tank. This hydrogen supply device supplies hydrogen gas stored in the pressure hydrogen tank to a fuel cell.

Furthermore, Japanese Unexamined Patent Application Publication No. 2021-21433 (JP 2021-21433 A) discloses a liquefied gas vaporizer that vaporizes liquid hydrogen using a heat exchanger using helium gas and supplies the vaporized liquid hydrogen to equipment such as a gas turbine.

In addition, Japanese Unexamined Patent Application Publication No. 2006-527808 (JP 2006-527808 A) discloses an engine that combusts hydrogen gas vaporized in a heat exchanger and air in a combustion chamber disposed outside a cylinder, and causes the combustion gas to flow into the cylinder to drive a piston.

SUMMARY

In recent years, hydrogen engine vehicles equipped with a hydrogen engine that directly burns hydrogen gas instead of gasoline have been used. Many hydrogen engine vehicles reduce the pressure of high-pressure hydrogen gas stored in a hydrogen gas tank and supply it to the hydrogen engine. However, the capacity of hydrogen gas that can be stored in the hydrogen gas tank is not very large, and there is a problem that the cruising distance of hydrogen engine vehicles is short. For this reason, a method of vaporizing liquid hydrogen stored in a liquid hydrogen tank instead of using a hydrogen gas tank and supplying the vaporized liquid hydrogen to a hydrogen engine is being studied.

Here, hydrogen engine vehicles run only with the driving force of a hydrogen engine. Therefore, hydrogen gas consumption fluctuates more in hydrogen engine vehicles than in fuel cell electric vehicles equipped with a fuel cell and a driving battery. For this reason, with a method of controlling the operation of a hydrogen pump based on the pressure of a hydrogen tank, as in the related art described in JP 2004-316779 A, in some cases it was not possible to suppress fluctuations in the pressure of hydrogen gas supplied to the hydrogen engine.

Furthermore, the lower the rotational speed of the hydrogen engine, the lower the required supply pressure to the hydrogen engine. Further, the required supply pressure to the hydrogen engine increases as the rotational speed of the hydrogen engine increases. For this reason, when the pressure of hydrogen gas is maintained at a high pressure at high rotational speeds in order to suppress pressure fluctuations in hydrogen gas, the amount of energy consumed by the hydrogen supply device increases. Additionally, since a high pressure is constantly applied to the hydrogen engine, required strength increases. This may lead to an increase in the weight of the hydrogen engine.

Therefore, an object of the present disclosure is to stably supply hydrogen gas to a hydrogen engine and to suppress the amount of energy consumed by a hydrogen supply device.

A hydrogen supply device of the present disclosure includes:

- a liquid hydrogen pump that boosts a pressure of liquid hydrogen stored in a liquid hydrogen tank;
- a vaporizer that converts liquid hydrogen discharged from the liquid hydrogen pump into hydrogen gas;
- a pressure chamber that is filled with hydrogen gas flowing out from the vaporizer and supplies the filled hydrogen gas to a hydrogen engine; and
- a pump control unit that adjusts a discharge flow rate of the liquid hydrogen pump.

Based on a flow rate of the hydrogen gas supplied to the hydrogen engine, an actual pressure of the pressure chamber, and a rotation speed of the hydrogen engine, the pump control unit adjusts the discharge flow rate of the liquid hydrogen pump such that the actual pressure of the pressure chamber becomes a target pressure, and the pump control unit changes the target pressure of the pressure chamber in accordance with the rotation speed of the hydrogen engine.

In this way, based on the flow rate of the hydrogen gas supplied to the hydrogen engine, the actual pressure of the pressure chamber, and the rotation speed of the hydrogen engine, the discharge flow rate of the liquid hydrogen pump is adjusted such that the actual pressure of the pressure chamber becomes the target pressure, and the target pressure of the pressure chamber is changed in accordance with the rotation speed of the hydrogen engine. Therefore, the hydrogen gas can be stably supplied to the hydrogen engine, and the amount of energy consumed by the hydrogen supply device can be suppressed.

In the hydrogen supply device of the present disclosure, the pump control unit may change the target pressure of the pressure chamber such that the target pressure of the pressure chamber when the rotation speed of the hydrogen engine is low becomes lower than the target pressure of the pressure chamber when the rotation speed of the hydrogen engine is high.

Accordingly, the hydrogen supply device of the present disclosure does not need to maintain the pressure of the pressure chamber at a high pressure state corresponding to a high rotational speed of the hydrogen engine. The hydrogen supply device of the present disclosure can suppress the amount of energy consumed by the hydrogen supply device.

In the hydrogen supply device of the present disclosure, when the rotation speed of the hydrogen engine is at an idling rotation speed, the pump control unit may set the target pressure of the pressure chamber to a first set pressure, when the rotation speed of the hydrogen engine is higher than a set rotation speed that is higher than the idling rotation speed, the pump control unit may set the target pressure of the pressure chamber to a second set pressure that is higher than the first set pressure, when the hydrogen engine is stopped, the pump control unit may set the target pressure of the pressure chamber to a third set pressure that is higher than the first set pressure and equal to or lower than the second set pressure, and when the actual pressure of the pressure chamber becomes the third set pressure, the pump control unit may stop the liquid hydrogen pump.

In this way, since high-pressure hydrogen gas is stored in the pressure chamber when the hydrogen engine is stopped, the next startup of the hydrogen engine is facilitated.

A hydrogen engine vehicle of the present disclosure includes:

- a hydrogen engine that drives a vehicle; and
- a hydrogen supply device that supplies hydrogen gas to the hydrogen engine, wherein:
- the hydrogen supply device includes
- a liquid hydrogen pump that boosts a pressure of liquid hydrogen stored in a liquid hydrogen tank,
- a vaporizer that converts liquid hydrogen discharged from the liquid hydrogen pump into hydrogen gas,
- a pressure chamber that is filled with hydrogen gas flowing out from the vaporizer and supplies the filled hydrogen gas to the hydrogen engine, and
- a pump control unit that adjusts a discharge flow rate of the liquid hydrogen pump.

The pump control unit changes a target pressure of the pressure chamber such that the target pressure of the pressure chamber when a rotation speed of the hydrogen engine is low becomes lower than the target pressure of the pressure chamber when the rotation speed of the hydrogen engine is high, and based on a flow rate of the hydrogen gas supplied to the hydrogen engine, an actual pressure of the pressure chamber, and the rotation speed of the hydrogen engine, the pump control unit adjusts the discharge flow rate of the liquid hydrogen pump such that the actual pressure of the pressure chamber becomes the target pressure.

In the hydrogen engine vehicle of the present disclosure, when the rotation speed of the hydrogen engine is at an idling rotation speed, the pump control unit may set the target pressure of the pressure chamber to a first set pressure, when the rotation speed of the hydrogen engine is higher than a set rotation speed that is higher than the idling rotation speed, the pump control unit may set the target pressure of the pressure chamber to a second set pressure that is higher than the first set pressure, when the hydrogen engine is stopped, the pump control unit may set the target pressure of the pressure chamber to a third set pressure that is higher than the first set pressure and equal to or lower than the second set pressure, and when the actual pressure of the pressure chamber becomes the third set pressure, the pump control unit may stop the liquid hydrogen pump.

According to the present disclosure, it is possible to stably supply hydrogen gas to a hydrogen engine and to suppress the amount of energy consumed by a hydrogen supply device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
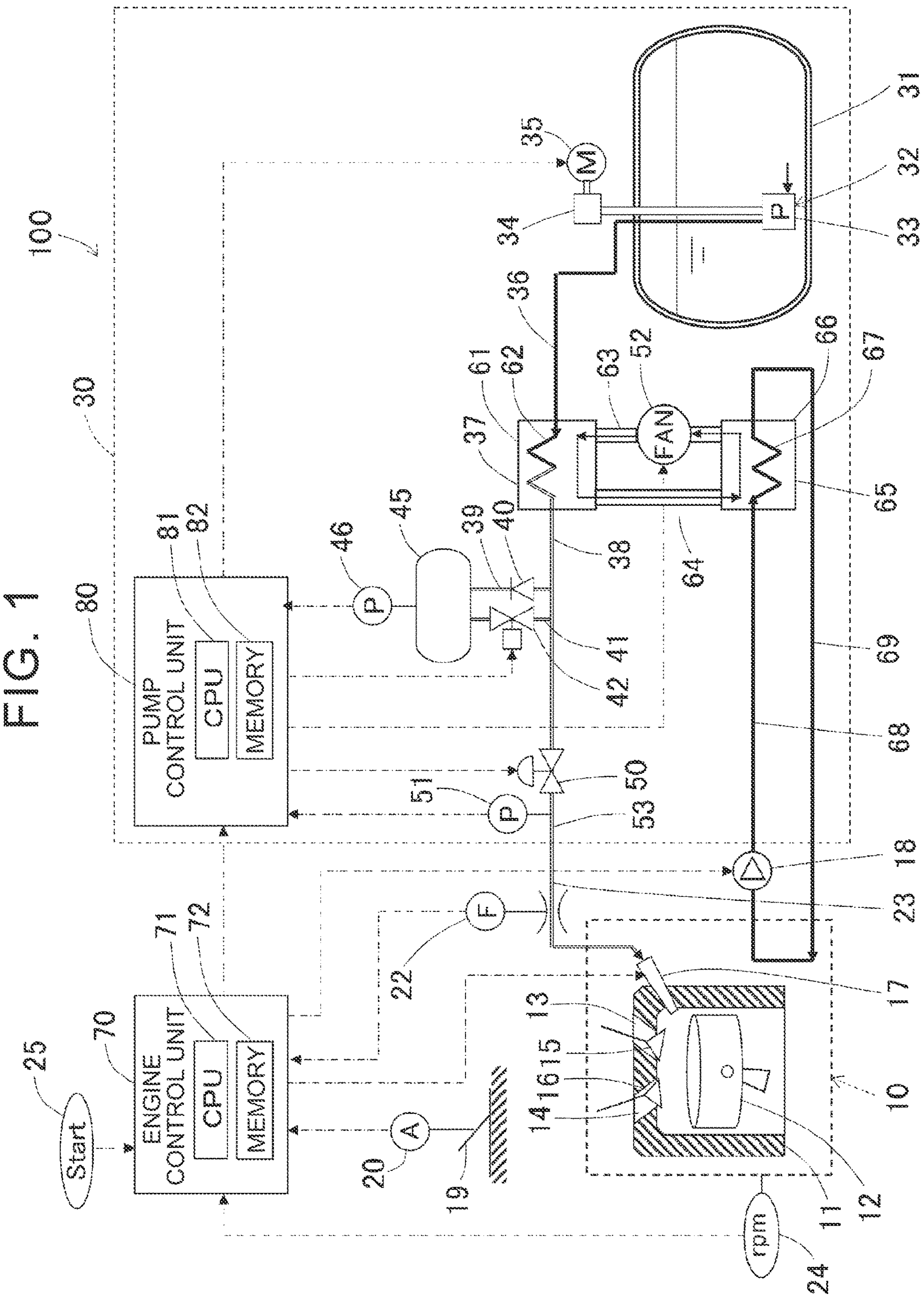
FIG. 1 is a system diagram showing the configuration of a hydrogen engine vehicle according to an embodiment.
Figure 5:
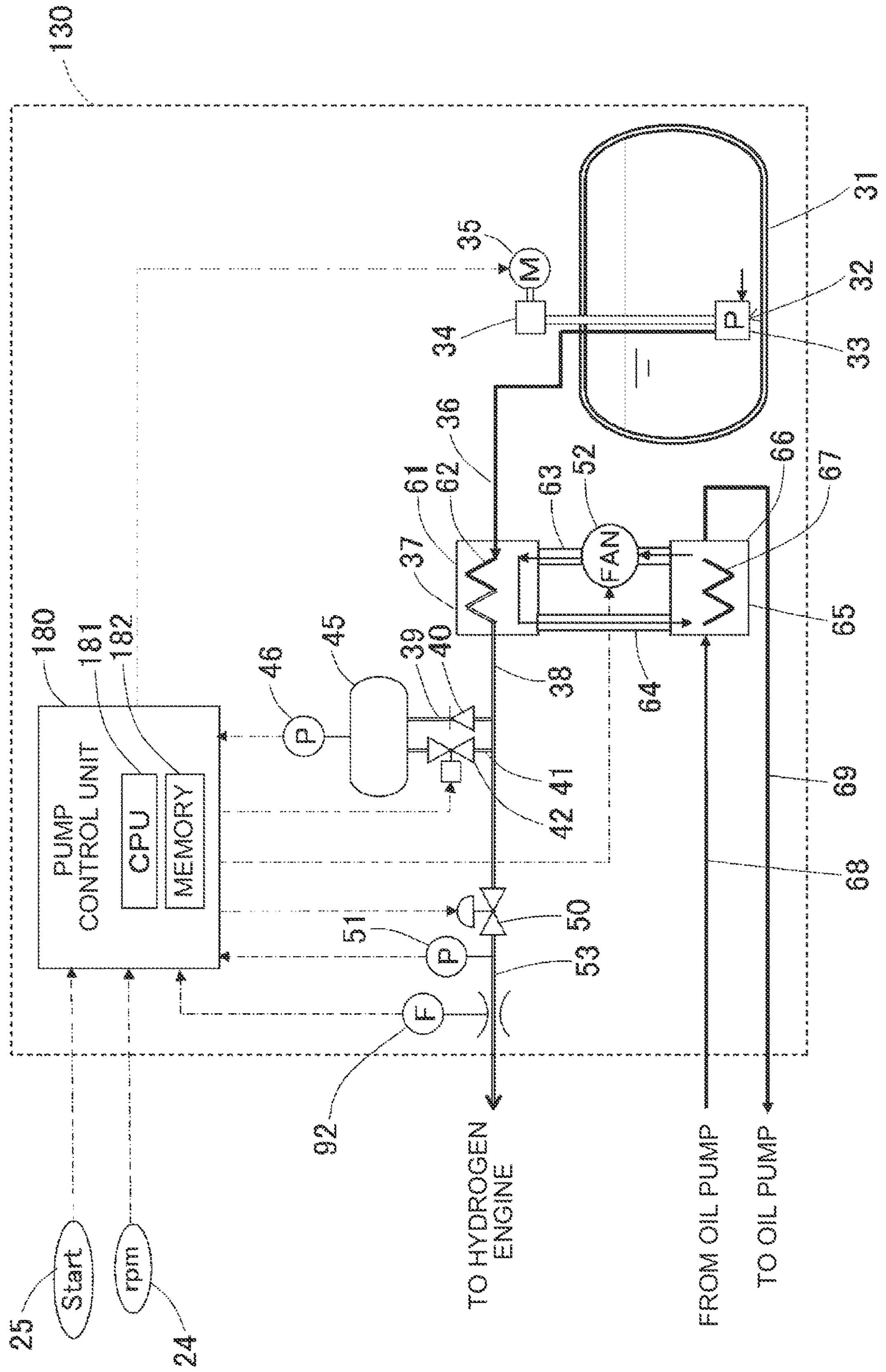
FIG. 5 is a system diagram showing the configuration of the hydrogen supply device of the embodiment.

Hereinafter, a hydrogen engine vehicle 100 according to an embodiment will be described with reference to the drawings. As shown in FIG. 1, a hydrogen engine vehicle 100 includes a hydrogen engine 10 for driving the vehicle and a hydrogen supply device 30. Note that in FIGS. 1 and 5, thick solid lines indicate liquid flow paths. In FIGS. 1 and 5, double lines indicate channels through which gas flows. Further, a dashed line indicates a signal flow.

As shown in FIG. 1, the hydrogen engine 10 is a reciprocating internal combustion engine that includes a plurality of cylinders 11 and a piston 12 that moves up and down within the cylinder 11. The hydrogen engine 10 has a similar structure to a gasoline engine. Note that in FIG. 1, one of the plurality of cylinders 11 is illustrated. An intake port 13 through which air flows into the cylinder 11 and an exhaust port 14 through which combustion gas in the cylinder 11 is discharged are provided at the top of the cylinder 11. An intake valve 15 and an exhaust valve 16 are attached to the intake port 13 and the exhaust port 14, respectively. An injector 17 that injects hydrogen gas into the cylinder 11 is attached above the side surface of the cylinder 11. A hydrogen gas introduction pipe 23 for introducing hydrogen gas supplied from a hydrogen supply device 30 is connected to the injector 17. Hydrogen gas supplied from the hydrogen gas introduction pipe 23 is injected into the cylinder 11 from the injector 17 and combusted inside the cylinder 11. The combustion gas moves the piston 12 up and down and rotates a crankshaft (not shown) connected to the lower end of the piston 12.

The hydrogen engine vehicle 100 is equipped with an accelerator 19, an opening degree sensor 20, a flow rate sensor 22, a rotation speed sensor 24, a start switch 25, and an engine control unit 70. Opening sensor 20 detects the operation amount of the accelerator 19. The opening signal detected by the opening degree sensor 20 is input to the engine control unit 70. Further, a flow rate sensor 22 is attached to the hydrogen gas introduction pipe 23 to detect the actual flow rate of hydrogen gas flowing into the hydrogen engine 10. The signal of the actual flow rate detected by the flow rate sensor 22 is input to the engine control unit 70. The rotation speed sensor 24 detects the rotation speed of the hydrogen engine 10. The rotation speed of the hydrogen engine 10 detected by the rotation speed sensor 24 is input to the engine control unit 70. Furthermore, a coolant pump 18 that circulates coolant to the hydrogen engine 10 is attached to the hydrogen engine vehicle 100. The coolant pump 18 operates according to commands from engine control unit 70. When the start switch 25 is turned on, the hydrogen engine 10 is started. When the start switch 25 is turned off, the hydrogen engine 10 stops.

The engine control unit 70 adjusts the flow rate of hydrogen supplied to the hydrogen engine 10. As shown in FIG. 1, the engine control unit 70 is a computer that includes a CPU 71, which is a processor that processes information, and a memory 72 that stores programs and control data. The engine control unit 70 calculates a target flow rate of hydrogen gas to be supplied to the hydrogen engine 10 based on the operation amount of the accelerator 19 detected by the opening degree sensor 20 and the rotational speed of the hydrogen engine 10 input from the rotation speed sensor 24. The engine control unit 70 then adjusts the operation of the injector 17 to adjust the flow rate of hydrogen gas to the hydrogen engine 10. The engine control unit 70 also regulates the operation of the coolant pump 18. Details of the configuration of engine control unit 70 will be explained later.

The hydrogen supply device 30 boosts the pressure of liquid hydrogen stored in the liquid hydrogen tank 31, vaporizes it, and supplies it to the hydrogen engine 10 as hydrogen gas at a supply pressure. The hydrogen supply device 30 includes a liquid hydrogen tank 31, a liquid hydrogen pump 32, a vaporizer 37, a pressure chamber 45, a pressure reducing valve 50, a warmer 65, and a pump control unit 80. When the start switch 25 is turned on, the hydrogen supply device 30 is started. When the start switch 25 is turned off, the hydrogen supply device 30 is stopped.

The liquid hydrogen tank 31 is a container with an adiabatic structure that stores cooled liquid hydrogen inside. The pressure inside the liquid hydrogen tank 31 is about the same as atmospheric pressure or slightly higher than atmospheric pressure.

The liquid hydrogen pump 32 is a reciprocating pump in which an in-tank piston 33 disposed inside the liquid hydrogen tank 31 reciprocates up and down. The liquid hydrogen pump 32 boosts the pressure of liquid hydrogen stored in the liquid hydrogen tank 31 to a pressure higher than the supply pressure of hydrogen gas supplied to the hydrogen engine 10. A motor 35 and a drive cam 34 that convert the rotational movement of the motor 35 into vertical reciprocating movement are arranged outside the liquid hydrogen tank 31. Further, the casing of the in-tank piston 33 is provided with a suction port for sucking in liquid hydrogen and a discharge port for discharging liquid hydrogen. A liquid hydrogen discharge pipe 36 is connected to the discharge port. The liquid hydrogen discharge pipe 36 extends from the inside of the liquid hydrogen tank 31 to the outside of the liquid hydrogen tank 31 and is connected to the vaporizer 37. When the motor 35 rotates, the drive cam 34 causes the in-tank piston 33 to reciprocate in the vertical direction, increasing the pressure of liquid hydrogen stored in the liquid hydrogen tank 31 and discharging it from the liquid hydrogen discharge pipe 36 to the vaporizer 37.

The vaporizer 37 is a heat exchanger between high-pressure liquid hydrogen discharged from the liquid hydrogen pump 32 and heated helium gas. The vaporizer 37 vaporizes liquid hydrogen into high-pressure hydrogen gas. The vaporizer 37 includes a casing 61 through which heated helium gas flows, and a tube 62 attached inside the casing 61 through which high-pressure liquid hydrogen flows.

The warmer 65 is a heat exchanger between the helium gas that has passed through the vaporizer 37 and the coolant of the hydrogen engine 10. The warmer 65 heats the helium gas whose temperature has decreased after passing through the vaporizer 37. The warmer 65 includes a casing 66 through which helium gas flows, and a tube 67 attached inside the casing 66 through which coolant for the hydrogen engine 10 flows.

The casing 61 of the vaporizer 37 and the casing 66 of the warmer 65 are connected by a heating gas duct 63 and a return duct 64. A fan 52 is attached to the heating gas duct 63. When the fan 52 is driven, helium gas circulates between the casing 66 of the warmer 65 and the casing 61 of the vaporizer 37. Fan 52 is driven by commands from pump control unit 80, which will be explained later. Further, the coolant for the hydrogen engine 10 is pressurized by the coolant pump 18 and circulates between the hydrogen engine 10 and the tube 67 of the warmer 65 through a supply pipe 68 and a return pipe 69. The coolant pump 18 operates according to commands from engine control unit 70.

The high temperature coolant of the hydrogen engine 10 flows through the tube 67 of the warmer 65 and warms the helium gas. The heated helium gas flows into the casing 61 of the vaporizer 37 from the heating gas duct 63, and exchanges heat with the high-pressure, low-temperature liquid hydrogen that flows from the liquid hydrogen discharge pipe 36 into the tube 62 of the vaporizer 37. Through heat exchange, liquid hydrogen is heated and vaporized. The liquid hydrogen becomes high-pressure hydrogen gas and flows out into the high-pressure hydrogen gas supply pipe 38.

A pressure chamber 45 is connected to the high-pressure hydrogen gas supply pipe 38 via a hydrogen gas filling pipe 39 and a hydrogen gas outlet pipe 41. The hydrogen gas outlet pipe 41 is connected to the downstream side of the hydrogen gas filling pipe 39. A check valve 40 is attached to the hydrogen gas filling pipe 39. Further, a gate valve 42 is attached to the hydrogen gas outlet pipe 41. A pressure sensor 46 is attached to the pressure chamber 45 to detect the actual pressure in the pressure chamber 45. The capacity of the pressure chamber 45 is the capacity for 30 seconds to 60 seconds of the maximum hydrogen consumption flow rate of the hydrogen engine 10. Thereby, even if the amount of hydrogen consumed by the hydrogen engine 10 changes rapidly, sudden changes in the pressure in the pressure chamber 45 can be suppressed.

When the hydrogen pressure in the high-pressure hydrogen gas supply pipe 38 is higher than the hydrogen pressure in the pressure chamber 45, the check valve 40 is opened and the pressure chamber 45 is filled with hydrogen gas from the hydrogen gas filling pipe 39. On the other hand, when the hydrogen pressure in the high-pressure hydrogen gas supply pipe 38 is lower than the hydrogen pressure in the pressure chamber 45, the hydrogen gas filled in the pressure chamber 45 passes through the hydrogen gas outlet pipe 41 and the gate valve 42, and the high-pressure hydrogen The gas flows out into the gas supply pipe 38. The gate valve 42 opens and closes according to commands from a pump control unit 80, which will be explained later.

A pressure reducing valve 50 is provided downstream of the hydrogen gas outlet pipe 41 of the high-pressure hydrogen gas supply pipe 38 to reduce the pressure of the high pressure hydrogen gas to the supply pressure. The pressure reducing valve 50 operates according to a command from the pump control unit 80, which will be explained later. The hydrogen gas whose pressure has been reduced to the supply pressure by the pressure reducing valve 50 flows out into a hydrogen gas supply pipe 53 connected to the downstream side of the pressure reducing valve 50. A pressure sensor 51 is attached to the hydrogen gas supply pipe 53 to detect the supply pressure of hydrogen gas. The hydrogen gas supply pipe 53 is connected to the hydrogen gas introduction pipe 23. The hydrogen gas supply pipe 53 supplies hydrogen gas to the injector 17 of the hydrogen engine 10.

The pump control unit 80 is a computer that includes a CPU 81, which is a processor that processes information, and a memory 82 that stores programs and control data. The pump control unit 80 is connected to the engine control unit 70, and data is input from the engine control unit 70. Further, a signal of the actual pressure in the pressure chamber 45 detected by the pressure sensor 46 is input to the pump control unit 80.

The pump control unit 80 adjusts the pressure reducing valve 50 so that the pressure of hydrogen gas detected by the pressure sensor 51 becomes a predetermined supply pressure. Pump control unit 80 also regulates the operation of fan 52. Furthermore, the actual pressure in the pressure chamber 45 is determined based on the hydrogen flow rate supplied to the hydrogen engine 10, the actual pressure in the pressure chamber 45 detected by the pressure sensor 46, and the rotation speed of the hydrogen engine 10 detected by the rotation speed sensor 24. The pump control unit 80 adjusts the discharge flow rate of the liquid hydrogen pump 32 so that the pressure reaches the target pressure. At the same time, the pump control unit 80 changes the target pressure of the pressure chamber 45 according to the rotation speed of the hydrogen engine 10.

Figure 2:
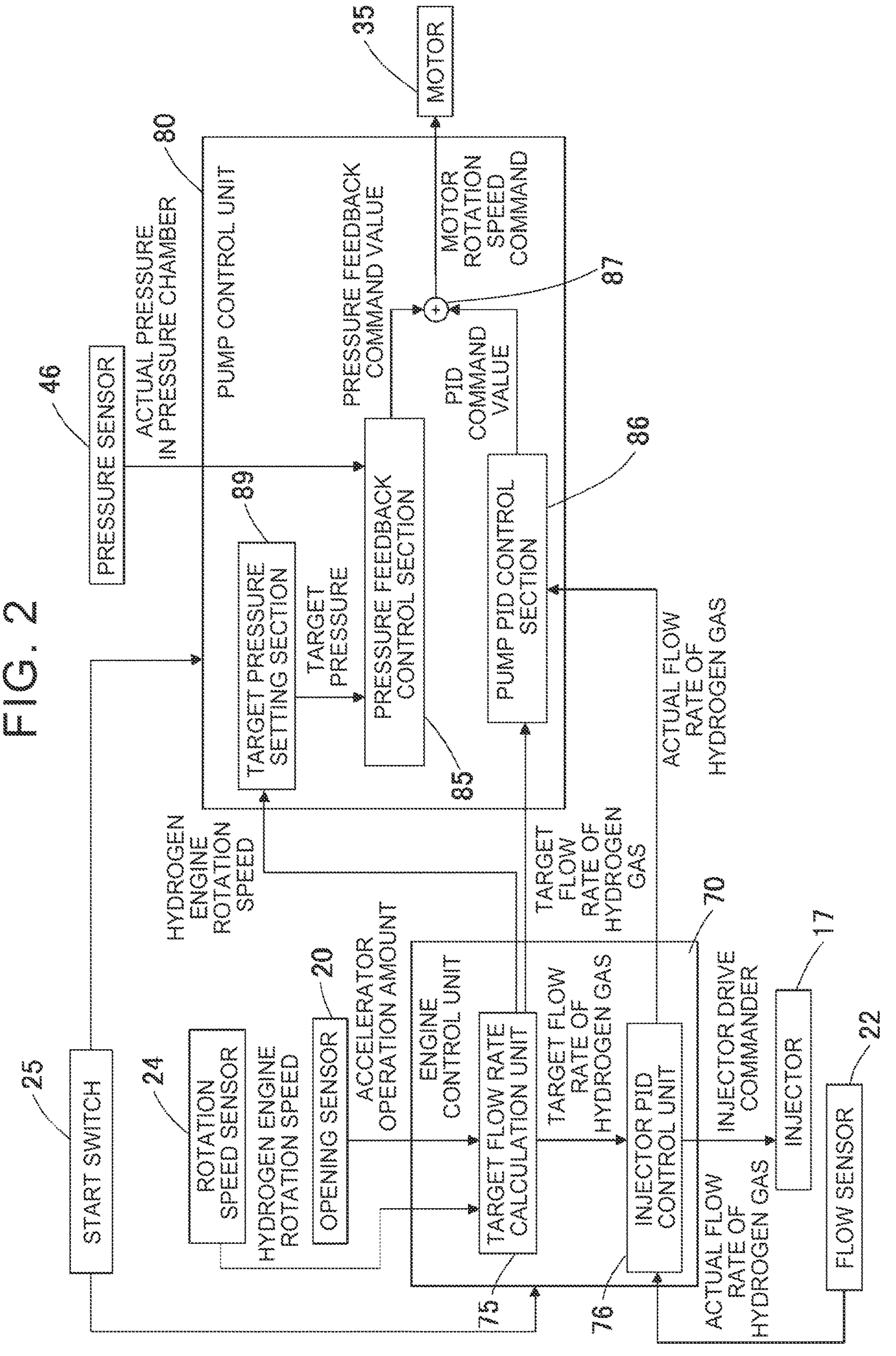
FIG. 2 is a functional block diagram of the engine control unit and pump control unit of the hydrogen engine vehicle shown in FIG. 1.

Next, details of the engine control unit 70 and the pump control unit 80 will be explained with reference to FIG. 2.

The engine control unit 70 includes two functional blocks: a target flow rate calculation unit 75 and an injector PID control section 76. Each functional block can be realized by the CPU 71 executing a program stored in the memory 72.

Based on the operation amount of the accelerator 19 inputted from the opening degree sensor 20 and the rotation speed of the hydrogen engine 10 inputted from the rotation speed sensor 24, the target flow rate calculation unit 75 of the engine control unit 70 calculates the target flow rate of hydrogen gas supplied to the hydrogen engine 10. The target flow rate may be calculated as a flow rate proportional to the operation amount of the accelerator 19, for example. Alternatively, a map of opening degree, rotation speed, and target flow rate may be stored in the memory 72, and the target flow rate may be calculated by referring to the map. Note that, in addition to the operation amount of the accelerator 19 and the rotational speed of the hydrogen engine 10, the target flow rate may be calculated by taking into account, for example, the speed of the hydrogen engine vehicle 100. The target flow rate calculation unit 75 outputs the calculated target flow rate to the injector PID control section 76 as well as to the pump PID control section 86 of the pump control unit 80. Further, the target flow rate calculation unit 75 outputs the rotation speed of the hydrogen engine 10 to the target pressure setting unit 89 of the pump control unit 80.

Based on the difference between the target flow rate of hydrogen gas input from the target flow rate calculation unit 75 and the actual flow rate of hydrogen gas detected by the flow rate sensor 22, the injector PID control unit 76 calculates an injector drive command by PID control. The injector PID control unit 76 then outputs an injector drive command to the injector 17. The injector 17 operates according to a drive command from the injector PID control section 76. Further, the injector PID control section 76 outputs the actual flow rate of hydrogen gas input from the flow rate sensor 22 to the pump PID control section 86 of the pump control unit 80.

The pump control unit 80 includes four functional blocks: a pressure feedback control unit 85, a pump PID control section 86, an adder 87, and a target pressure setting unit 89. Each functional block is realized by the CPU 81 executing a program stored in the memory 82.

The hydrogen supply device 30 may generate hydrogen gas at the same flow rate as the actual flow rate of hydrogen gas consumed by the hydrogen engine 10. The amount of hydrogen gas generated is proportional to the flow rate of liquid hydrogen discharged from the liquid hydrogen pump 32. Therefore, the flow rate of liquid hydrogen discharged from the liquid hydrogen pump 32 may be controlled to be proportional to the actual flow rate of hydrogen gas consumed by the hydrogen engine 10. However, when the flow rate of hydrogen gas generated by the hydrogen supply device 30 is smaller than the flow rate of hydrogen gas consumed by the hydrogen engine 10, the actual pressure in the pressure chamber 45 decreases. Conversely, when the flow rate of hydrogen gas generated by the hydrogen supply device 30 is greater than the flow rate of hydrogen gas consumed by the hydrogen engine 10, the actual pressure in the pressure chamber 45 increases. When the actual pressure in the pressure chamber 45 fluctuates, the supply pressure of hydrogen gas downstream of the pressure reducing valve 50 fluctuates. Furthermore, when the actual pressure in the pressure chamber 45 becomes lower than the supply pressure, hydrogen gas cannot be supplied to the hydrogen engine 10.

Therefore, the pump control unit 80 uses the pump PID control section 86 to control the liquid hydrogen so that the flow rate of the liquid hydrogen discharged from the liquid hydrogen pump 32 corresponds to the flow rate of the hydrogen gas supplied to the hydrogen engine 10. A PID command value for adjusting the rotation speed of the motor 35 of the liquid hydrogen pump 32 is calculated. Further, the pressure feedback control unit 85 calculates a pressure feedback command value for adjusting the rotation speed of the motor 35 of the liquid hydrogen pump 32 so that the actual pressure in the pressure chamber 45 becomes the target pressure. Then, an adder 87 adds the PID command value and the pressure feedback command value to generate a motor rotation speed command. Then, the rotation speed of the motor 35 is adjusted. As a result, hydrogen gas commensurate with the flow rate of hydrogen gas consumed by the hydrogen engine 10 is supplied to the hydrogen engine 10, and the actual pressure of the pressure chamber 45 is adjusted to the target pressure, thereby stably supplying hydrogen gas to the hydrogen engine 10. Can be supplied.

Further, the pump control unit 80 changes the target pressure of the pressure chamber 45 so that when the rotation speed of the hydrogen engine 10 is low, the target pressure of the pressure chamber 45 is lower than when the rotation speed of the hydrogen engine 10 is high. Thereby, it is not necessary to always maintain the pressure in the pressure chamber 45 at a high pressure state corresponding to a high rotational speed, and the amount of energy consumed by the hydrogen supply device 30 can be suppressed. The details of the pump control unit 80 will be explained below.

Based on the difference between the target flow rate and the actual flow rate of hydrogen gas input from the engine control unit 70, the pump PID control unit 86 outputs a PID command value regarding the rotation speed of the motor 35 of the liquid hydrogen pump 32. This PID command value is calculated based on the difference between the target value and the actual flow rate of hydrogen gas, which is the same as that of the injector PID control unit 76. Therefore, this PID command value becomes a command value that is synchronized with the injector drive command. Therefore, the PID command value can make the flow rate of liquid hydrogen discharged from the liquid hydrogen pump 32 correspond to the flow rate of hydrogen gas supplied to the hydrogen engine 10.

Figure 3:
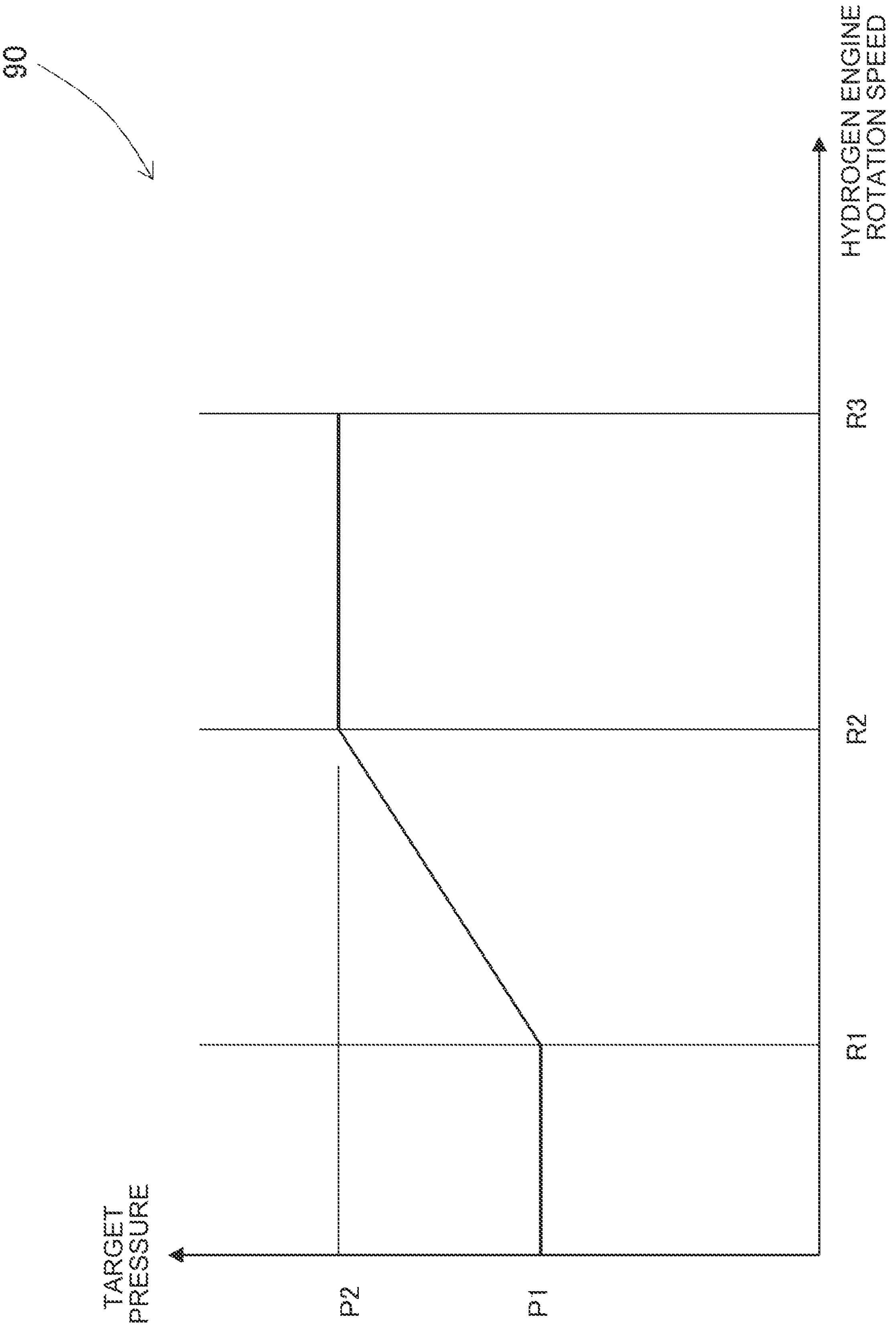
FIG. 3 is a map showing changes in the set pressure of the pressure chamber with respect to the rotational speed of the hydrogen engine stored in the target pressure setting section shown in FIG. 2.

Based on the rotational speed of the hydrogen engine 10 inputted from the engine control unit 70, the target pressure setting unit 89 sets the target pressure of the pressure chamber 45. The target pressure setting unit 89 then outputs to the pressure feedback control unit 85. The target pressure setting unit 89 stores therein a map 90 of target pressures with respect to the rotational speed of the hydrogen engine 10 as shown in FIG. 3. Then, the target pressure corresponding to the rotation speed of the hydrogen engine 10 input with reference to the map 90 is output.

The map 90 shown in FIG. 3 will now be explained. In FIG. 3, R1 indicates the idling rotation speed R1 of the hydrogen engine 10. Further, R3 indicates the maximum rotation speed R3 of the hydrogen engine 10. R2 indicates a set rotation speed R2 set between the idling rotation speed R1 and the maximum rotation speed R3. The set rotation speed R2 may be set, for example, as an intermediate value between the idling rotation speed R1 and the maximum rotation speed R3. As shown in FIG. 3, when the rotational speed of the hydrogen engine 10 is the idling rotation speed R1, the target pressure becomes the lowest first set pressure P1. Then, when the rotation speed of the hydrogen engine 10 is higher than the set rotation speed R2, the target pressure becomes the second set pressure P2. When the rotational speed of the hydrogen engine 10 is between the idling rotation speed R1 and the set rotation speed R2, the target pressure increases as the rotational speed of the hydrogen engine 10 increases. The first set pressure P1 is a pressure slightly higher than the required supply pressure to the hydrogen engine 10 when the rotational speed of the hydrogen engine 10 is the idling rotation speed R1. Further, the second set pressure P2 is a pressure slightly higher than the pressure supplied to the hydrogen engine 10 when the rotational speed of the hydrogen engine 10 is the maximum rotation speed R3. For example, the first set pressure P1 and the second set pressure P2 may be about 10% higher than the required supply pressure to the hydrogen engine 10 in each state.

Based on the difference between the target pressure input from the target pressure setting unit 89 and the actual pressure in the pressure chamber 45 detected by the pressure sensor 46, the pressure feedback control unit 85 outputs a pressure feedback control command value. The pressure feedback command value is such that when the actual pressure in the pressure chamber 45 becomes lower than the target pressure, the rotation speed of the motor 35 of the liquid hydrogen pump 32 is increased to increase the discharge flow rate, and conversely, the actual pressure in the pressure chamber 45 becomes lower than the target pressure. When it becomes higher than the pressure, this is a command value that lowers the rotation speed of the motor 35 of the liquid hydrogen pump 32 and lowers the discharge flow rate.

The adder 87 adds the PID command value and the pressure feedback command value to generate a rotation speed command for the motor 35. When adding, the two command values may be simply added or may be weighted and added. For example, if the fluctuation in the amount of hydrogen consumed by the hydrogen engine 10 is not very large, the weight of the pressure feedback command value may be made larger than the weight of the PID command value. Conversely, if the hydrogen consumption amount of the hydrogen engine 10 fluctuates greatly, the weight of the PID command value may be increased to improve responsiveness.

Next, control of the rotation speed of the motor 35 of the pump control unit 80 configured as described above will be explained.

When the rotational speed of the hydrogen engine 10 is the idling rotation speed R1, the pump control unit 80 sets the target pressure to the lowest first set pressure P1 and drives the motor 35 at a low rotational speed. Here, when the accelerator 19 is depressed and the flow rate of hydrogen gas supplied to the hydrogen engine 10 increases, the pump control unit 80 increases the rotation speed of the motor 35 by an amount commensurate with the increase in the flow rate of hydrogen gas. Further, when the rotation speed of the hydrogen engine 10 increases due to the accelerator 19 being depressed, the pump control unit 80 increases the target pressure of the pressure chamber 45 with reference to the map 90 shown in FIG. 3. Then, the pump control unit 80 increases the rotation speed of the motor 35 by an amount corresponding to the increase in the flow rate of hydrogen gas and an amount that increases the actual pressure in the pressure chamber 45.

Conversely, when the accelerator 19 is no longer depressed, the flow rate of hydrogen gas decreases and the rotational speed of the hydrogen engine 10 decreases from the set rotation speed R2 to the idling rotation speed R1. In this case, the pump control unit 80 reduces the rotational speed of the motor 35 by an amount corresponding to the reduction in the flow rate of hydrogen gas and an amount that reduces the actual pressure in the pressure chamber 45.

In this way, the PID command value and the pressure feedback command value are added to generate a rotation speed command for the motor 35, the rotation speed of the motor 35 of the liquid hydrogen pump 32 is adjusted, and the discharge flow rate of the liquid hydrogen pump 32 is adjusted. Therefore, hydrogen gas commensurate with the flow rate of hydrogen gas consumed by the hydrogen engine 10 can be supplied to the hydrogen engine 10, and hydrogen gas can be stably supplied to the hydrogen engine 10 by setting the actual pressure of the pressure chamber 45 to the target pressure. Further, the pressure in the pressure chamber 45 is changed depending on the rotation speed of the hydrogen engine 10. Therefore, it is not necessary to maintain the pressure in the pressure chamber 45 at a high pressure state corresponding to the high rotational speed of the hydrogen engine 10, and the amount of energy consumed by the hydrogen supply device 30 can be suppressed.

Next, with reference to FIG. 4, the operation of pump control unit 80 when hydrogen engine vehicle 100 is stopped will be explained. When the rotation speed of the hydrogen engine 10 is the idling rotation speed R1, the pump control unit 80 adjusts the rotation speed of the motor 35 of the liquid hydrogen pump 32 so that the actual pressure in the pressure chamber 45 becomes the first set pressure P1.

Figure 4:
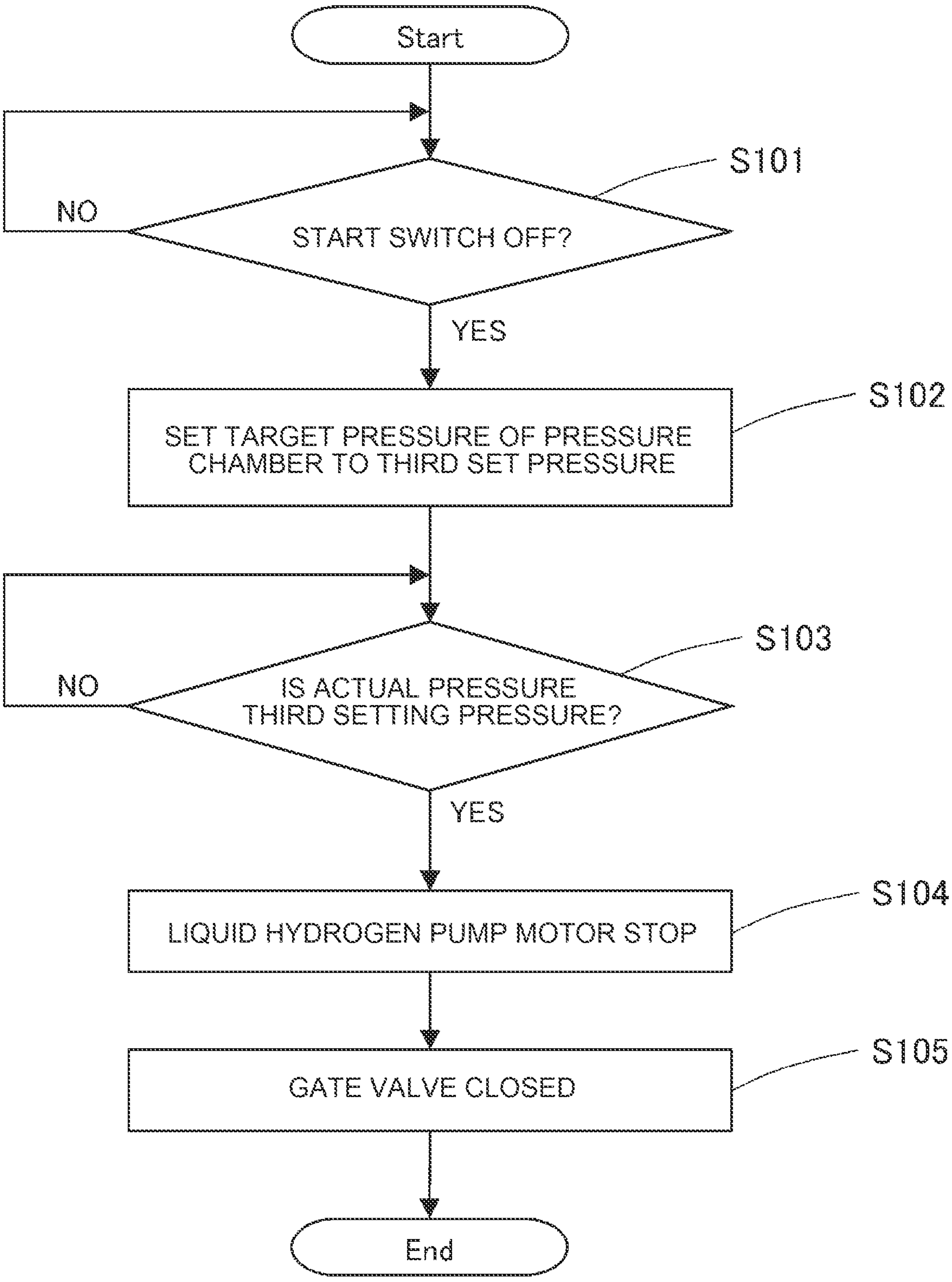
FIG. 4 is a flowchart showing the operation of the pump control unit when the hydrogen engine is stopped.

When the start switch 25 is turned off in this state, the pump control unit 80 determines YES in S101 of FIG. 4 and proceeds to S102 of FIG. 4. Then, the pump control unit 80 sets the set pressure of the pressure chamber 45 to a third set pressure P3 higher than the first set pressure P1 and lower than the second set pressure P2. Here, the third set pressure P3 may be set to the same pressure as the second set pressure P2.

As a result, the rotation speed of the motor 35 increases. Accordingly, the actual pressure in the pressure chamber 45 increases. Note that the temperature of the coolant of the hydrogen engine 10 is high immediately after the hydrogen engine 10 is stopped. Therefore, the liquid hydrogen flowing into the vaporizer 37 from the liquid hydrogen pump 32 is vaporized and becomes hydrogen gas. In S103 of FIG. 4, the pump control unit 80 waits until the actual pressure in the pressure chamber 45 reaches the third set pressure P3. If the pump control unit 80 determines YES in S103 of FIG. 4, it proceeds to S104 of FIG. 4, stops the motor 35 of the liquid hydrogen pump 32, and closes the gate valve 42 in S105 of FIG. 4.

This allows high-pressure hydrogen gas to be stored in the pressure chamber 45 when the hydrogen engine 10 is stopped, making it easier to start the hydrogen engine 10 the next time.

Note that when the start switch 25 is turned off, if the actual pressure in the pressure chamber 45 is higher than the third set pressure P3, the pump control unit 80 may stop the motor 35 of the liquid hydrogen pump 32 and close the gate valve 42 without changing the target pressure setting.

In the above explanation, the pump control unit 80 was explained as receiving the target flow rate of hydrogen gas, the actual flow rate of hydrogen gas detected by the flow rate sensor 22, and the rotation speed of the hydrogen engine 10 from the engine control unit 70. However, it is not limited to this. For example, it may be configured such that the signal of the actual flow rate of hydrogen gas and the rotation speed are input directly from the flow rate sensor 22 and the rotation speed sensor 24 without going through the engine control unit 70.

In addition, in the above description, the pump control unit 80 sets the PID command value for the rotation speed of the motor 35 of the liquid hydrogen pump 32 based on the difference between the target flow rate and the actual flow rate of hydrogen gas input from the engine control unit 70. Although the explanation has been made assuming that the pump PID control section 86 is provided to output the PID command value, the present disclosure is not limited thereto. For example, based on one input of the target flow rate of hydrogen gas or the actual flow rate of hydrogen gas from the engine control unit 70, the proportional command value is calculated by proportional control, as in the hydrogen supply device 130 shown in FIGS. 5 and 6. The rotation speed command of the motor 35 may be generated based on this and the pressure feedback command value.

Next, a hydrogen supply device 130 having a different configuration from the hydrogen supply device 30 described above will be described with reference to FIGS. 5 and 6. The same parts as those of the hydrogen supply device 30 described above are given the same reference numerals, and the description thereof will be omitted.

As shown in FIG. 5, the hydrogen supply device 130 includes a flow rate sensor 92 that is attached to the hydrogen gas supply pipe 53 and detects the flow rate of hydrogen gas supplied to the hydrogen engine 10. The flow rate signal detected by the flow rate sensor 92 and the signal from the rotation speed sensor 24 are input to the pump control unit 180. The pump control unit 180 is a computer that includes a CPU 181 that is a processor that processes information, and a memory 182 that stores programs and control data. Unlike the pump control unit 80 of the hydrogen supply device 30 of the previously described embodiment, the pump control unit 180 is not connected to the engine control unit 70.

Figure 6:
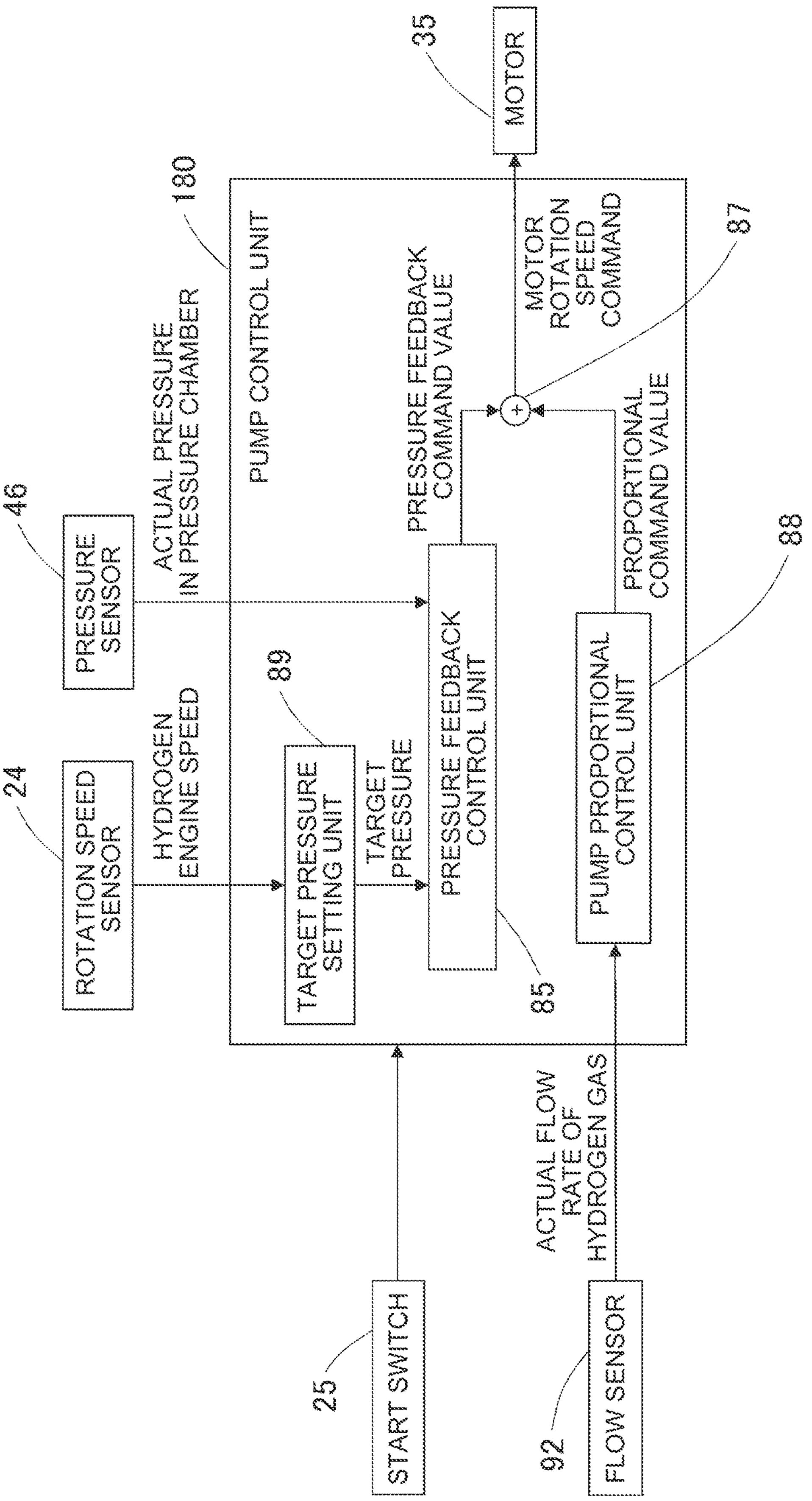
FIG. 6 is a functional block diagram of a pump control unit of the hydrogen supply device shown in FIG. 5.

As shown in FIG. 6, the pump control unit 180 includes a pump proportional control unit 88 in place of the pump PID control section 86 of the pump control unit 80 described above. The pump proportional control unit 88 multiplies the actual flow rate of hydrogen gas detected by the flow rate sensor 92 by a proportional constant to calculate a proportional command value. The proportional command value allows the hydrogen supply device 130 to generate hydrogen gas that is linked to fluctuations in the flow rate of hydrogen gas consumed by the hydrogen engine 10. Similarly to the hydrogen supply device 30 described above, the hydrogen supply device 130 can adjust the actual pressure of the pressure chamber 45 to the target pressure.

What is claimed is:

1. A hydrogen supply device comprising:
- a liquid hydrogen pump that boosts a pressure of liquid hydrogen stored in a liquid hydrogen tank;
- a vaporizer that converts liquid hydrogen discharged from the liquid hydrogen pump into hydrogen gas;
- a pressure chamber that is filled with hydrogen gas flowing out from the vaporizer and supplies the filled hydrogen gas to a hydrogen engine; and
- a pump control unit that adjusts a discharge flow rate of the liquid hydrogen pump, wherein based on a flow rate of the hydrogen gas supplied to the hydrogen engine, an actual pressure of the pressure chamber, and a rotation speed of the hydrogen engine, the pump control unit adjusts the discharge flow rate of the liquid hydrogen pump such that the actual pressure of the pressure chamber becomes a target pressure, and the pump control unit changes the target pressure of the pressure chamber in accordance with the rotation speed of the hydrogen engine.

2. The hydrogen supply device according to claim 1, wherein the pump control unit changes the target pressure of the pressure chamber such that the target pressure of the pressure chamber when the rotation speed of the hydrogen engine is low becomes lower than the target pressure of the pressure chamber when the rotation speed of the hydrogen engine is high.

3. The hydrogen supply device according to claim 2, wherein when the rotation speed of the hydrogen engine is at an idling rotation speed, the pump control unit sets the target pressure of the pressure chamber to a first set pressure, when the rotation speed of the hydrogen engine is higher than a set rotation speed that is higher than the idling rotation speed, the pump control unit sets the target pressure of the pressure chamber to a second set pressure that is higher than the first set pressure, when the hydrogen engine is stopped, the pump control unit sets the target pressure of the pressure chamber to a third set pressure that is higher than the first set pressure and equal to or lower than the second set pressure, and when the actual pressure of the pressure chamber becomes the third set pressure, the pump control unit stops the liquid hydrogen pump.

4. A hydrogen engine vehicle comprising: a hydrogen engine that drives a vehicle; and
- a hydrogen supply device that supplies hydrogen gas to the hydrogen engine, wherein:
- the hydrogen supply device includes
  - a liquid hydrogen pump that boosts a pressure of liquid hydrogen stored in a liquid hydrogen tank,
  - a vaporizer that converts liquid hydrogen discharged from the liquid hydrogen pump into hydrogen gas,
  - a pressure chamber that is filled with hydrogen gas flowing out from the vaporizer and supplies the filled hydrogen gas to the hydrogen engine, and
  - a pump control unit that adjusts a discharge flow rate of the liquid hydrogen pump; and
- the pump control unit changes a target pressure of the pressure chamber such that the target pressure of the pressure chamber when a rotation speed of the hydrogen engine is low becomes lower than the target pressure of the pressure chamber when the rotation speed of the hydrogen engine is high, and based on a flow rate of the hydrogen gas supplied to the hydrogen engine, an actual pressure of the pressure chamber, and the rotation speed of the hydrogen engine, the pump control unit adjusts the discharge flow rate of the liquid hydrogen pump such that the actual pressure of the pressure chamber becomes the target pressure.

5. The hydrogen engine vehicle according to claim 4, wherein when the rotation speed of the hydrogen engine is at an idling rotation speed, the pump control unit sets the target pressure of the pressure chamber to a first set pressure, when the rotation speed of the hydrogen engine is higher than a set rotation speed that is higher than the idling rotation speed, the pump control unit sets the target pressure of the pressure chamber to a second set pressure that is higher than the first set pressure, when the hydrogen engine is stopped, the pump control unit sets the target pressure of the pressure chamber to a third set pressure that is higher than the first set pressure and equal to or lower than the second set pressure, and when the actual pressure of the pressure chamber becomes the third set pressure, the pump control unit stops the liquid hydrogen pump.

* * * * *